(12) United States Patent
Errera

(10) Patent No.: US 6,990,892 B2
(45) Date of Patent: Jan. 31, 2006

(54) ENHANCED FOOD EMBOSSING STAMPER DEVICE

(76) Inventor: Richard Ben Errera, 39 Richmond Blvd., Unit 1A, Ronkonkoma, NY (US) 11779

( * ) Notice: Subject to any disclaimer, the term of this patent is extended or adjusted under 35 U.S.C. 154(b) by 391 days.

(21) Appl. No.: 10/634,439

(22) Filed: Aug. 5, 2003

(65) Prior Publication Data

US 2004/0040446 A1    Mar. 4, 2004

Related U.S. Application Data

(60) Provisional application No. 60/406,448, filed on Aug. 28, 2002.

(51) Int. Cl.
*A47J 37/08*    (2006.01)

(52) U.S. Cl. .............................. 99/388; 99/353; 99/349

(58) Field of Classification Search .................. 99/388, 99/349, 353, 355; 425/298, 299, 318, 284
See application file for complete search history.

(56) References Cited

U.S. PATENT DOCUMENTS

| | | | | |
|---|---|---|---|---|
| 1,624,214 A | * | 4/1927 | Cannon | 99/349 |
| 1,989,287 A | * | 1/1935 | Parr | 99/349 |
| 4,029,012 A | * | 6/1977 | Smith et al. | 101/368 |
| 4,285,978 A | | 8/1981 | Quinlivan | 426/87 |
| 4,290,349 A | | 9/1981 | Fiorenza | 99/388 |
| 4,532,642 A | * | 7/1985 | Morris et al. | 377/15 |
| 4,578,273 A | | 3/1986 | Krubert | 426/87 |
| 4,656,927 A | | 4/1987 | Mosby | 99/388 |
| 5,017,394 A | | 5/1991 | Macpherson | 426/302 |
| 5,074,778 A | * | 12/1991 | Betts et al. | 425/394 |
| 5,419,250 A | * | 5/1995 | Ferguson | 99/495 |
| 5,789,009 A | | 8/1998 | Kordic | 426/391 |
| 5,834,047 A | | 11/1998 | Ahn | 426/383 |
| 5,992,305 A | | 11/1999 | Naivar | 99/388 |
| 5,996,476 A | | 12/1999 | Schultz | 99/349 |
| 6,242,026 B1 | | 6/2001 | Feeley | 426/383 |

* cited by examiner

*Primary Examiner*—Reginald L. Alexander

(57) ABSTRACT

An impression device for food items. More particularly, the present invention is a stamping device designed to create indented or raised images upon a variety of foods for decoration and/or marketing purposes. The stamper device of the present invention has the general appearance of a traditional rubber stamp, with large knob at the top to quickly adjust the depth of embossings. Small wings beside the knob provide an instant feature for orientation and comfortable ergonomic grip. The device provides both an emboss-only mode, and emboss-and-cut simultaneously mode, much in the manner of a cookie cutter. A simple snap, slide, or push means located at the bottom of the device functions to change such modes. Under the base of the device is a "socket set" style snap-in stamping die. As is the case with the roller device, the stamper device may be utilized for: 1) standard messages and images; 2) snap-in, slide-in, or push-in letters, which allows the user to assemble his or her own custom message; or 3) custom logos, messages, and images.

19 Claims, 10 Drawing Sheets

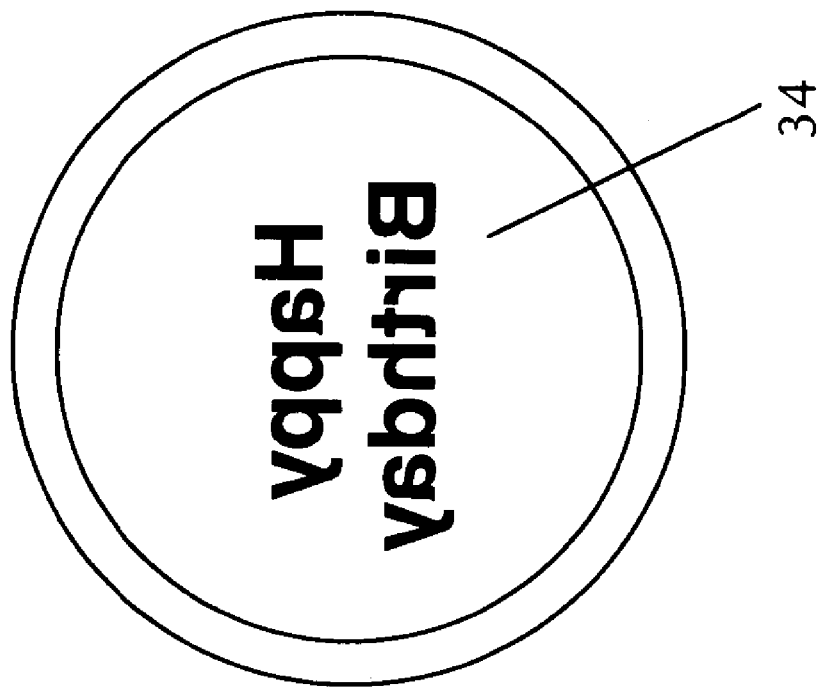
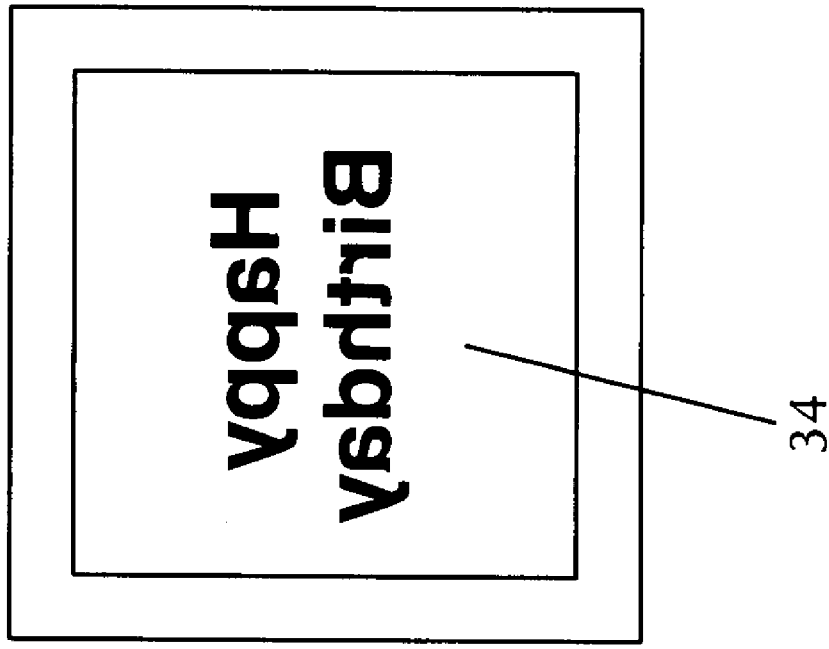
Fig. 2

Fig. 6
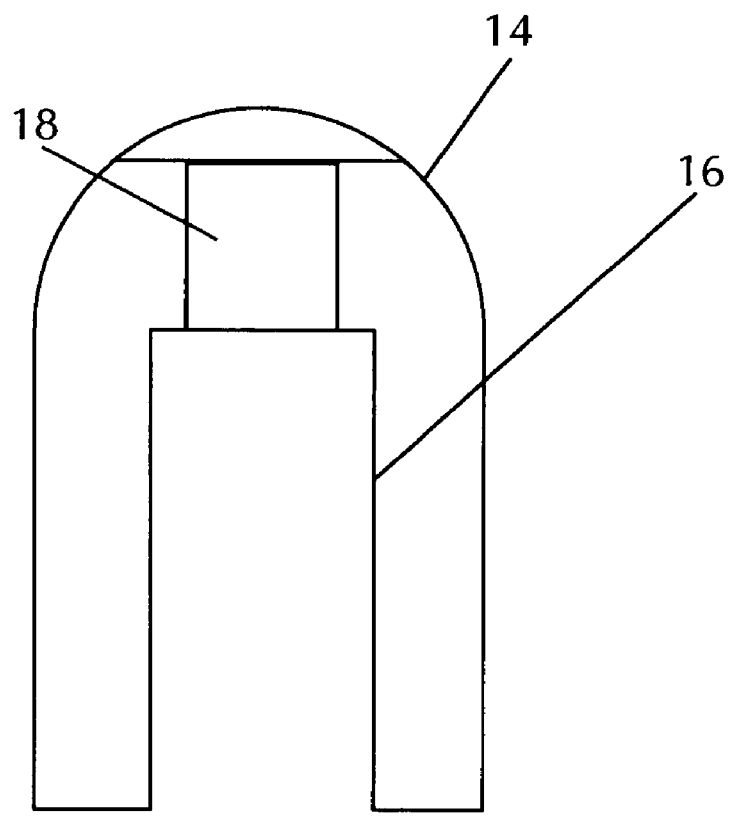
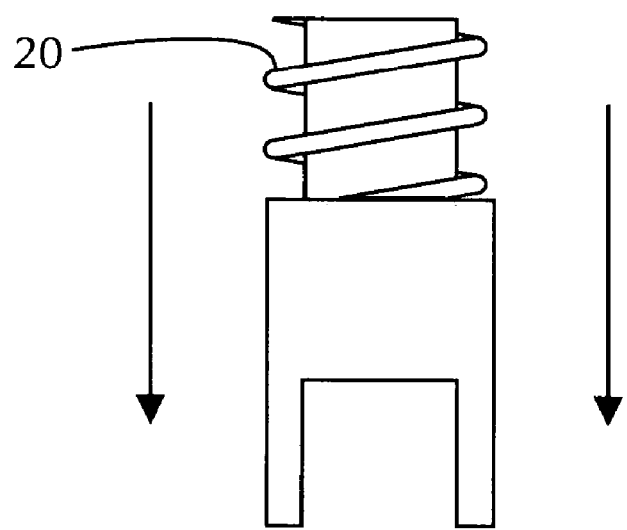

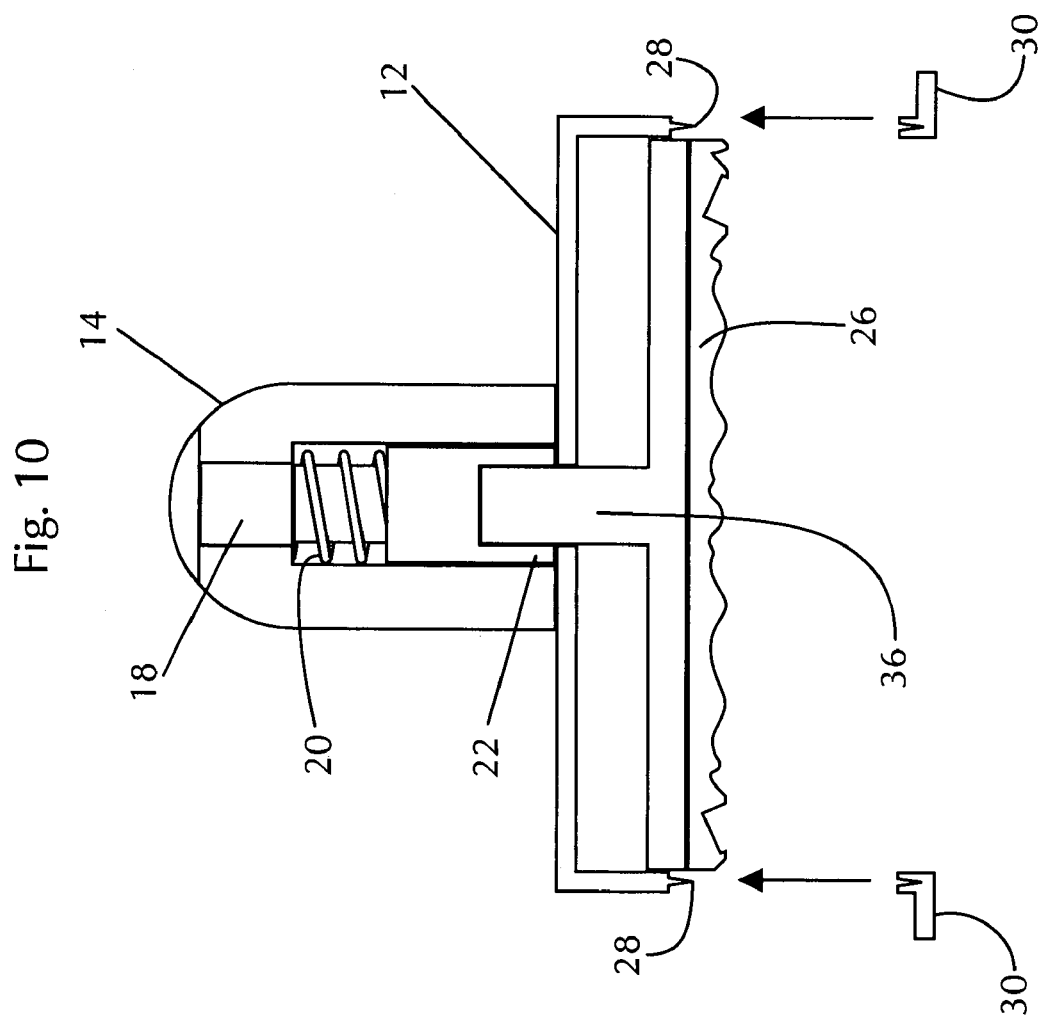

ENHANCED FOOD EMBOSSING STAMPER DEVICE

This application relates to material disclosed in Provisional Patent Application No. 60/406,448, filed on Aug. 28, 2002 by the present Applicant.

BACKGROUND OF THE INVENTION

1. Field of the Invention

The present invention is an impression device for food items. More particularly, the present invention is an enhanced stamper device designed to create indented or raised images upon a variety of foods for decoration and/or marketing purposes.

2. Description of the Prior Art

Numerous innovations for decorative food devices have been provided in the prior art that are described as follows. Even though these innovations may be suitable for the specific individual purposes to which they address, they differ from the present invention as hereinafter contrasted. The following is a summary of those prior art patents most relevant to the invention at hand, as well a description outlining the differences between the features of the present invention and those of the prior art.

1. U.S. Pat. No. 5,996,476, Invented by Schultz, Entitled "Device for Pressing, Imprinting and Cooking Flat Bread Products"

The patent to Schultz describes an imprinting press and cooking apparatus for a dough product which includes an imprinting station with respective opposed lower press and upper imprinting plates and rotating plate or endless belt conveyors adjacent the imprinting station for moving the dough product which has been pressed and imprinted through a cooking or baking phase. Heat sources are disposed adjacent the imprinting station and the conveyors for preheating the dough product for release from the printing station and for cooking the dough product, respectively. A pressure air slide is disposed between conveyor stages for transferring the dough product from one conveyor stage to another. Pressure air is supplied to the air slide through a conduit and into a chamber for flow through a perforated plate which supports the dough product for movement along the slide.

2. U.S. Pat. No. 6,242,026, Invented by Feeley, Entitled "Illustration Applicator For Food Products"

The patent to Feeley describes a method of creating food product, such as pizza, which will produce an illustrated, decorative personalized food product by using edible symbols and or edible granules and or edible powder. The edible symbols, granules or powder, which may have coloring, are applied to the surface of food product by using a symbol placement applicator that applies precut symbols and or a stencil placement applicator, which applies granulated or powdered edibles to form designs. The symbols and or granulated or powder design is fused to the food product during a thermal fusing process.

3. U.S. Pat. No. 4,578,273, Invented by Krubert, Entitled "Printing of Foods"

The patent to Krubert describes a method of forming a printed food or baked product, and the product itself comprises forming a hard, non-porous icing surface by drying an icing mixture and printing one or more edible inks on the hard surface of the icing using a printing pad having an edible silicone oil therein. The icing may be in the form of a coating on a hard baked product. The specific gravity of the icing mixture before drying is between about 1.0 and 2.5 and, preferably, between about 1.05 and 1.5. The hard baked product has a finished moisture of between about 2–10% by weight of the finished baked product and, preferably, between about 2–8% by weight.

4. U.S. Pat. No. 5,789,009, Invented by Kordic et al., Entitled "Pizza Pie with Crust Structure"

The patent to Kordic et al. describes a pizza mold and method for making a pizza which includes a frame having a generally planar surface with one or more cavities extending across an extent of the frame. One cavity can be disposed at a location on the frame which corresponds to a desired configuration for the pizza. One or more cavities can in addition or alternatively extend across the frame in a desired geometric or fanciful configuration, such as an alpha-numeric character, cartoon character, etc. The dough is brought into contact with the frame either by forming the dough across the surface of the frame such that the dough covers the frame and is pressed into the cavities, or the dough can be located only within the cavities. In the former case, the frame is removed with the cavities imparting raised ridges of dough on the crust, while in the latter case the flat pizza pie can be formed separately and the frame inverted such that the dough in the frame is transferred onto the surface of the pie to impart the raised ridges of dough on the pie. Toppings can be located between (or within) the ridges on the dough, and the dough is baked such that the ridges form crust on the pizza.

5. U.S. Pat. No. 4,285,978, Invented by Quinlivan, Entitled "Method for Decorating Baked Goods and the Like"

The Quinlivan invention describes a method whereby decorative designs and the like can be formed upon baked goods by transferring a pre-printed design from a transfer material to an uncooked dough surface. In one embodiment the dough surface is first covered with a thin layer of flour preparatory to transferring a water-soluble ink design to the dough. In a preferred embodiment after the dough is baked a liquid glaze is applied to the surface thereof for imparting a decorative and protective coating to the baked goods. The process of the invention is suitable for both hand and automated operation.

6. U.S. Pat. No. 5,017,394, Invented by Macpherson et al., Entitled "Method for Making Edible Base Shapes Having Pictorial Images for Decorating Foodstuffs"

The patent to Macpherson et al. describes a method of using a silk screen to form thin, flat, flexible, free standing base shapes or transfers directly on release paper in their final form from fluid base shape material, all in one step. After drying, pictorial images are then silk screened onto the base shapes to produce the final edible image for decorating foodstuffs. Recipes for preparing the fluid base shape material and a novel machine for peeling the base shapes from the release paper with a spring steel blade are also disclosed.

7. U.S. Pat. No. 5,834,047, Invented by Ahn, Entitled "Method for Imprinting Confectionery Products with Edible Ink"

The Ahn invention relates to a method of imprinting diverse shapes of multiple colors inside the confectionery products with edible ink. According to the present invention, a liquified mixture of confectionery material is partially filled and solidified in a plurality of molds. A plurality of etching plates, which have been partially perforated along the predetermined shape and according to the number of predetermined colors, are mounted on the surface of the solidified mixture. Edible ink of predetermined colors is dispersed by turns on the plurality of said etched plates, and the remaining portion of the liquified mixture is filled and solidified in the plurality of molds.

8. U.S. Pat. No. 4,656,927, Invented by Mosby et al., Entitled "Device for Making Designs on Toast"

The patent to Mosby et al. describes a device for producing designs on a slice of bread during toasting of the bread which comprises a bread holding member removably received within the toast well of an electric toaster. The bread holding member is of lightweight heat resistive material having a bottom portion resting on the bread carriage member of the toaster and side panels which receive and carry a slice of bread to be toasted. Either or both of the side panels has a template cut out defining a framed central opening with a design therein. The design shields the bread slice from the heat of the toaster such that the design will be reproduced on the bread slice in toasting. An insulated handle provides for inserting and removing the bread holder from the toast well and to protect the user from accidental burns or electrical shock. The bread holding member is isolated from direct contact with electrical conduit and heating elements of the toaster. A modification of the device includes removable side panels.

9. U.S. Pat. No. 5,992,305, Invented by Naivar, Entitled "Diamond Shaped Charmarker"

The patent to Naivar describes a charmarker for creating complex grid pattern of mark, such as a diamond-shaped gird pattern, on foods as the foods pass under the charmarker on a conveyer. The charmarker contains a rotating shaft on which heated char marking rings rotatably hang. Each of the rings is provided with parallel, spaced apart cross marking members located at the periphery of the ring. The shaft is provided with ridges and valleys that engage, in a gear fashion, teeth and grooves provided on an interior opening surface of each ring in order to keep the rings in synchronized rotation as they pass over the food. Synchronized rotation of the rings keeps the cross marking members on the rings aligned so that the desired grid pattern of mark appears on the food.

10. U.S. Pat. No. 4,290,349, Invented by Fiorenza, Entitled "Toaster Accessory"

In the patent to Fiorenza, a toaster accessory is provided in the form of a pair of hinged foraminous panels forming a holder adapted to hold one or several slices of bread therebetween. In its preferred use, a sandwich is placed between the two panels and the holder, when closed, is dimensioned to fit into a conventional toaster so that a pre-made sandwich may be conveniently toasted therein. The hinge connection between the two panels is self-adjusting and a locking device at the opposite end is able to lock at different thicknesses. Decorative inserts may be added to the panels for making designs on the surface of the toasted bread.

The relevant prior art described above largely entails: imprinting and cooking devices for dough products that include press and imprinting plates; edible symbols and/or granulated or powder designs fused to food by thermal fusing processes; printing edible inks on the hard surface of icing of hard baked products; and various pre-printed designs applied to uncooked dough surfaces.

In contrast, the stamper device of the present invention creates images upon foods via actual embossing or stamping, for decoration and/or marketing purposes. As such the device may be utilized for: 1) standard messages and images; 2) snap-in, slide-in, or push-in letters, which allows the user to assemble his or her own custom message; or 3) custom logos, messages, and images.

The stamper device, which has the appearance of a traditional rubber stamp, provides both an emboss-only mode, and emboss-and-cut simultaneously mode, much in the manner of a cookie cutter. A simple snap slide, or push means located at the bottom of the device functions to change such modes. A large knob at the top functions to quickly adjust the depth of embossings, and small wings beside the knob provide an instant feature for orientation and comfortable ergonomic grip.

SUMMARY OF THE INVENTION

As noted, the present invention is an impression device for food items. More particularly, the present invention is a stamping device designed to create images upon a variety of foods for decoration and/or marketing purposes.

The stamper device of the present invention has the general appearance of a traditional rubber stamp, with large knob at the top to quickly adjust the depth of embossings. Small wings beside the knob provide an instant feature for orientation and comfortable ergonomic grip. The device provides both an emboss-only mode, and emboss-and-cut simultaneously mode, much in the manner of a cookie cutter. A simple snap, slide, or push means located at the bottom of the device functions to change such modes.

Under the base of the device is a "socket set" style snap-in stamping die, which allows the stamper device to be utilized for: 1) standard messages and images; 2) snap-in, slide-in, or push-in letters (which allow the user to assemble his or her own custom message); or 3) custom logos, messages, and images.

In light of the foregoing, it is generally an object of the present invention to provide a device that embosses images and/or letters onto a variety of foods.

It is also an object of the invention to provide a versatile device that may be used in a great variety of commercial, industrial, or residential applications.

It is a further object of the invention to provide an item that may be constructed of a variety of relatively inexpensive materials suitable to accomplish the aforementioned purposes.

It is an additional object of the invention to provide an item that may be produced in a variety of sizes, according to need.

It is also an object of the invention to provide a device that allows the user to customize embossing patterns through usage of a convenient snap-in, slide-in, or push-in feature.

It is another aim of the invention to provide a device that allows for embossing of standard phrases and images or custom phrases and images.

It is also an object of the invention to provide a device that allows for incusing of letters or graphics onto foods, leaving raised letters or graphics that effectively withstand the dough rising or baking process.

It is also an object of the invention to provide a device that allows for embossing of a variety of outline shapes, such as square, rectangular, or circular.

It is another object of the invention to provide a device that may be used to cut food while embossing.

It is a further object of the invention to provide a device which may comprise wavy edges to emboss an interesting and aesthetically-pleasing edge on a variety of foods.

It is also an object of the invention to provide a device that utilizes a minimal number of parts.

It is also an object of the invention to provide a device that may be assembled and disassembled by the user easily.

It is also an object of the invention to provide a device that may be easily cleaned in commercial or residential dishwashers.

It is also an object of the invention to provide a device that may be injection molded, cast, molded, or machined by the manufacturer.

It is another aim of the invention to provide a device that can withstand considerable heat, and is constructed to be highly durable in nature.

It is also an object of the invention to provide a device that allows the user to adjust the depth of embossing for foods that have differing embossing needs and thickness.

Finally, it is an object of the invention to provide a device that allows the user to apply color to the embossing on or in the food for decorating and/or advertising purposes.

The novel features which are considered characteristic for the invention are set forth in the claims. The invention itself, both as to its construction and its method of operation, together with additional objects and advantages thereof, will be best understood from the following description of the embodiments when read and understood in connection with accompanying drawings.

BRIEF DESCRIPTION OF PREFERRED EMBODIMENTS

FIG. 2 is a bottom view of the present invention, illustrating square and round imprint shapes, for the purposes of example only.

FIG. 6 is a front partial exploded view of the handle portion of the present invention, illustrating depth control means for the purposes of example.

FIG. 10 is a front perspective view of the present invention, illustrating the principal components thereof, including removable covers for the cutting means.

DETAILED DESCRIPTION OF THE PREFERRED EMBODIMENT

The present invention is a stamper device that embosses images and/or letters into a variety of foods. Although the device is primarily intended for use in commercial and catering locations, usage is not limited to such applications. The device may also be effectively used in residential settings as well as a variety of additional contexts.

Figure 1:
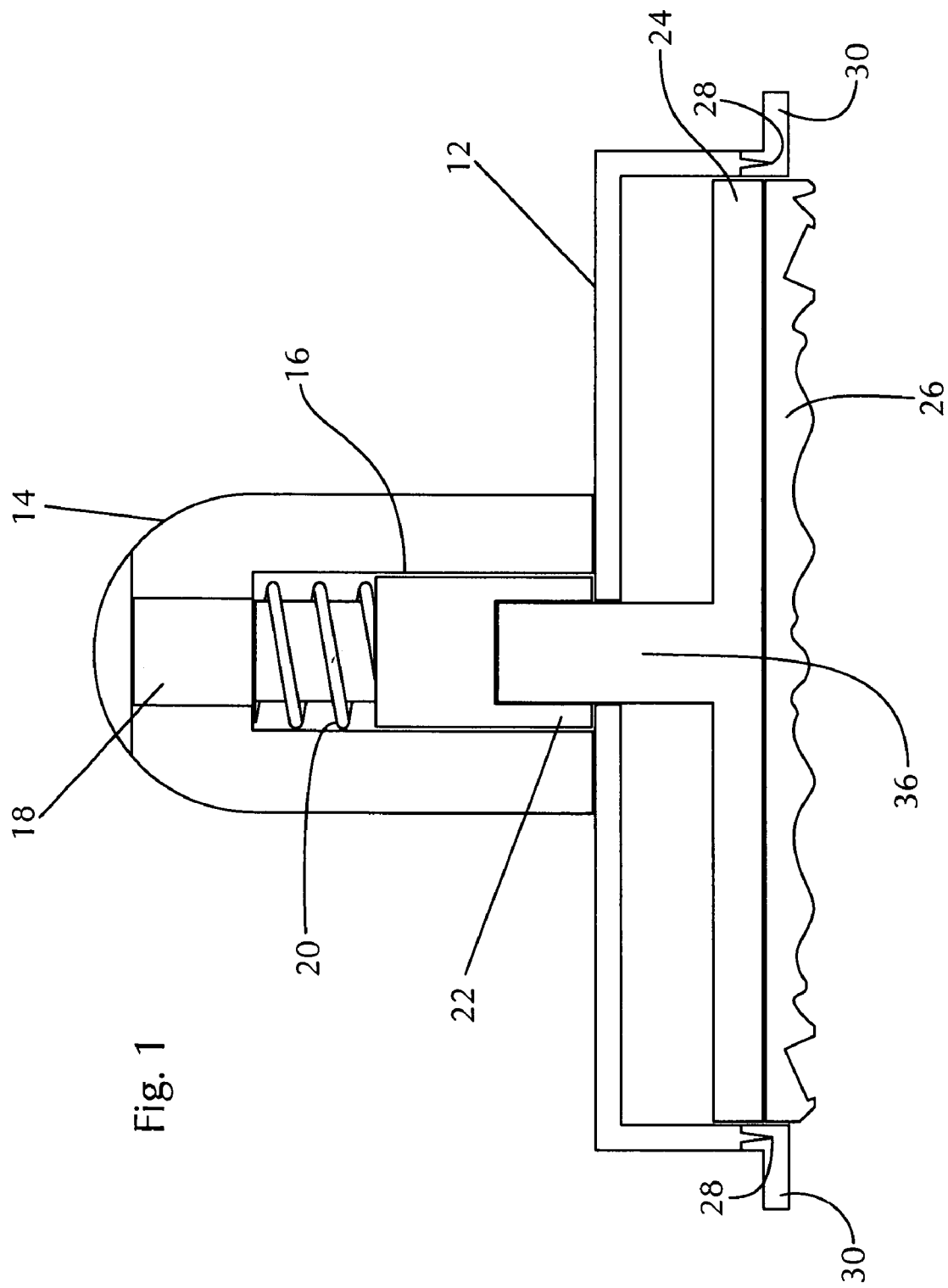
FIG. 1 is a front perspective view of the present invention, illustrating the principal components thereof.
Figure 4:
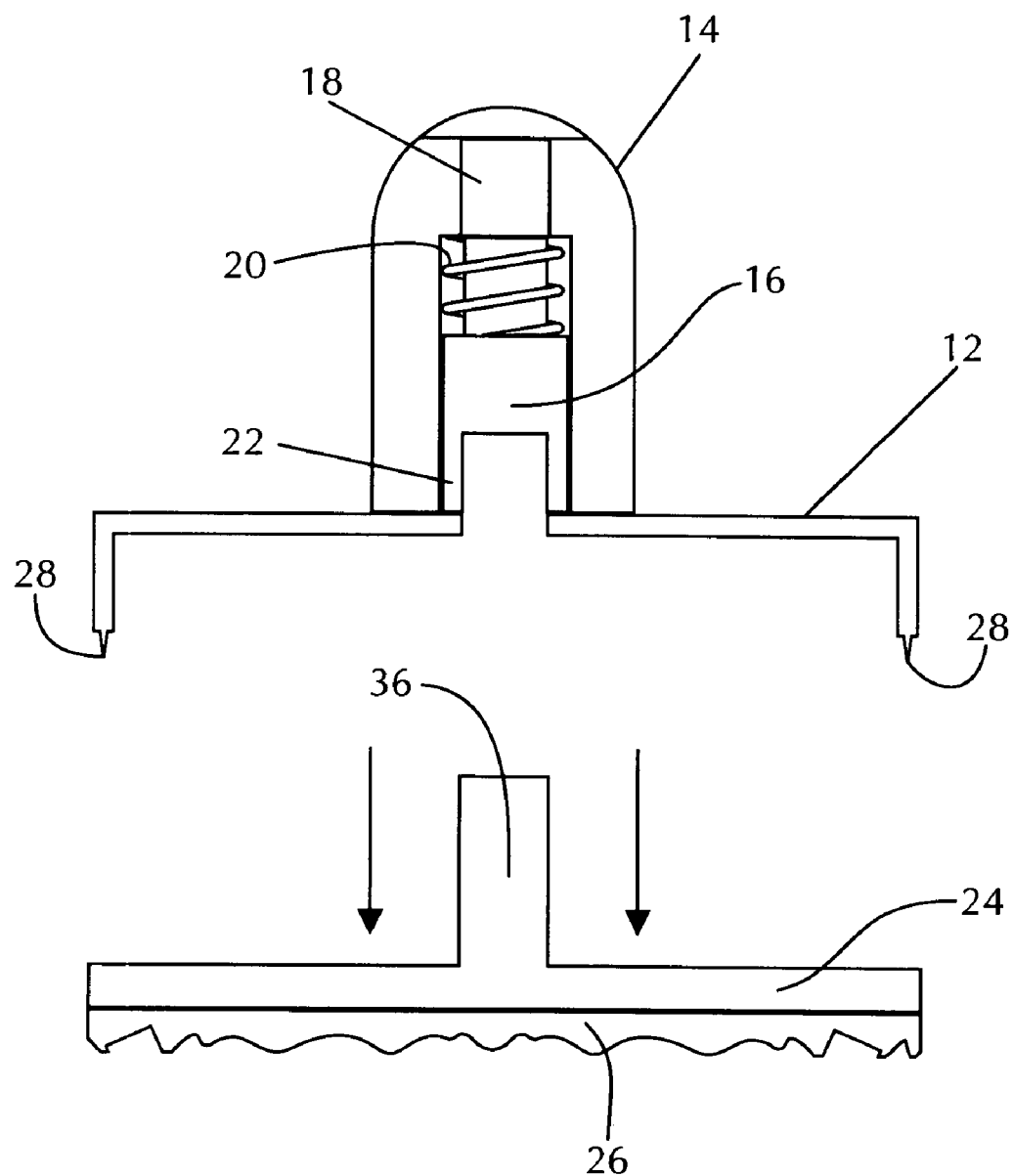
FIG. 4 is a front partial exploded view of the present invention, illustrating the principal components thereof.
Figure 5:
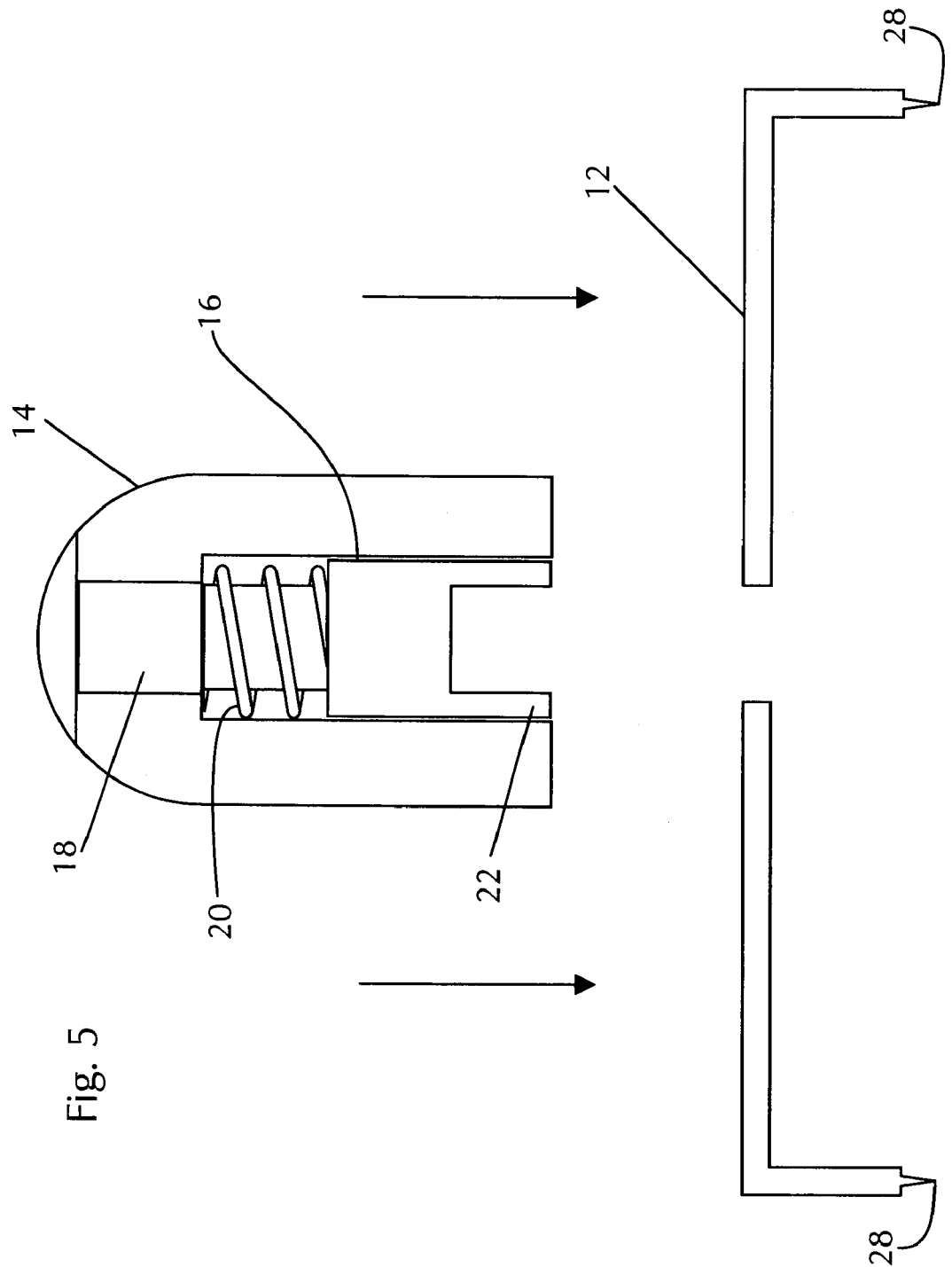
FIG. 5 is a front partial exploded view of the present invention, illustrating the principal components thereof.
Figure 7:
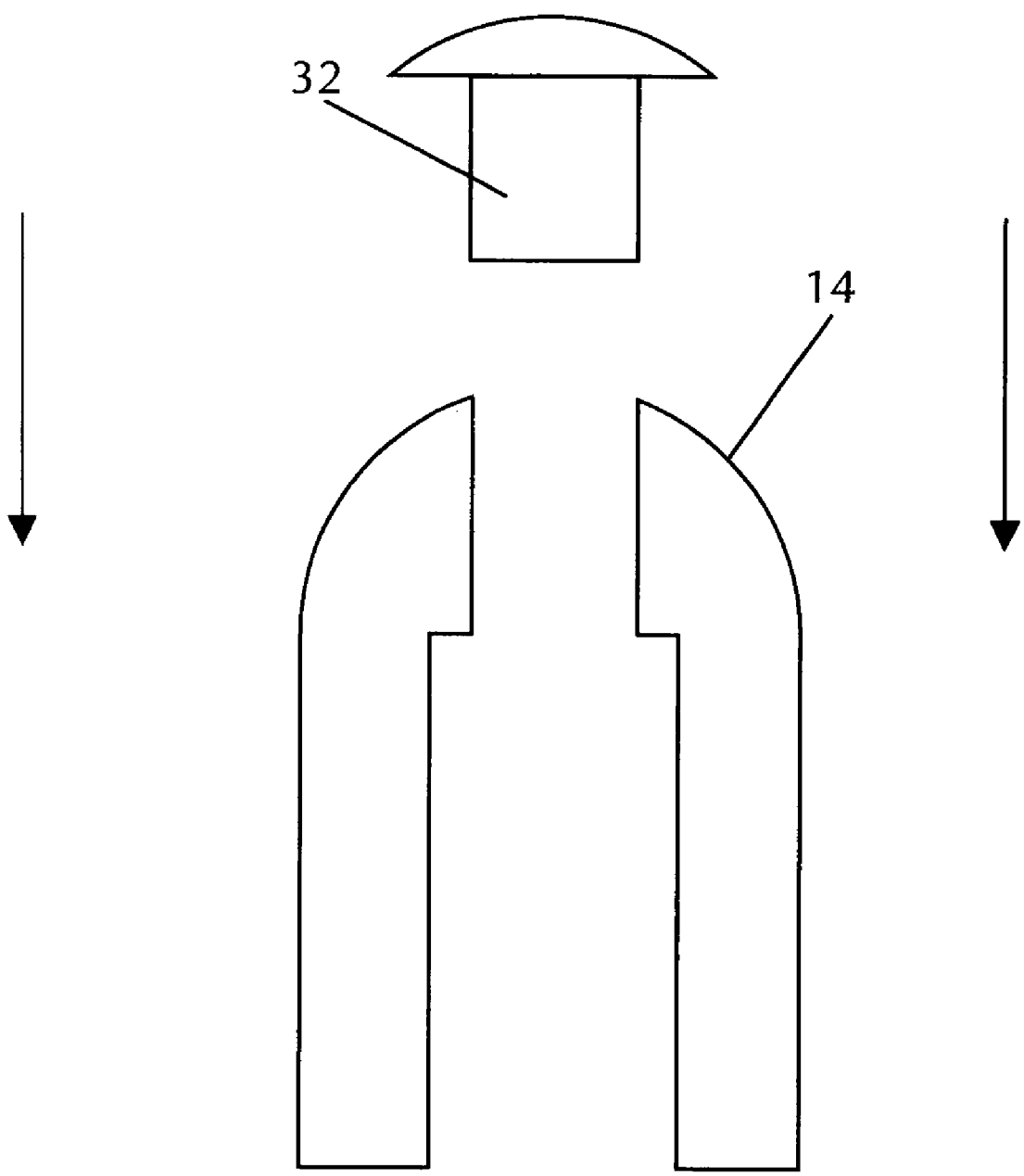
FIG. 7 is a front partial exploded view of the handle portion of the present invention.
Figure 8:
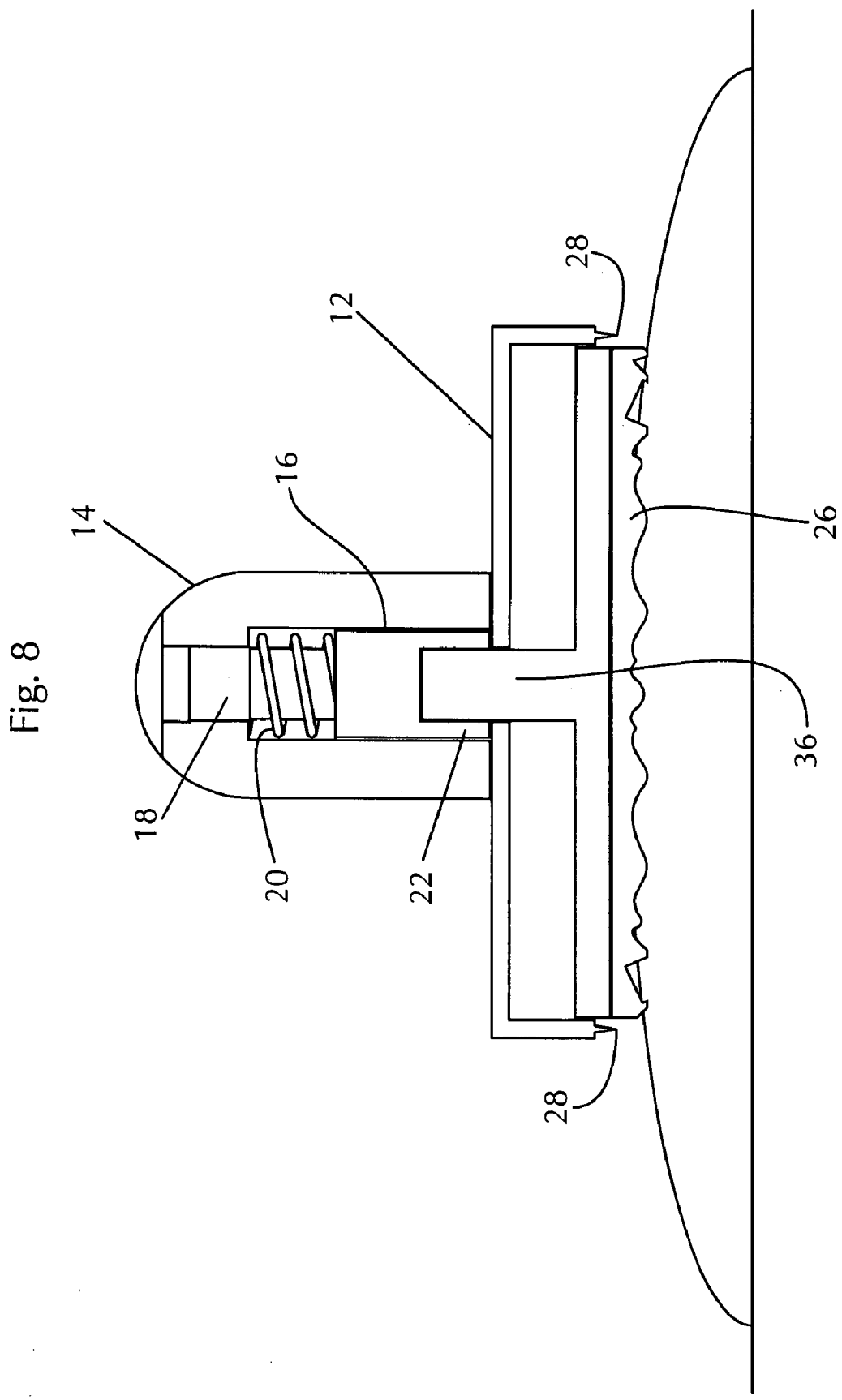
FIG. 8 is a front perspective view of the present invention, illustrating the device as applied to a food item, for the purposes of example.

Specifically, as shown in FIGS. 1, 4, and 5, in the preferred mode of production, the stamp device consists of three main assemblies. An upper assembly (14) comprises a handle that is attached to a shaft housing (16). The handle is of sufficient size and configuration to allow the user to comfortably grip and operate the stamp device repeatedly. Importantly, the handle may be either attached to, or incorporated within, the shaft housing (16) depending upon manufacturer preference, as shown in FIGS. 6 and 7.

A generally cylindrical shaft (18) is oriented vertically therein. This shaft (18) comprises two main diameters: a first diameter is smaller and located on the top of the shaft. A second diameter is larger and is located at the bottom of the shaft.

The differing diameters function to create a means to limit downward movement, as well as a spring seat. More particularly, the upper diameter allows a seat for a spring (20), which allows the shaft (18) to be forced downward against the bottom.

An opening for the embossing assembly (22) is located on the bottom face of the shaft (18). As previously noted, the embossing assembly (24) may comprise any of a variety of embossing patterns (26), to provide significant versatility for industrial, commercial, or residential usage. Specifically, as illustrated by FIG. 4, the shaft housing (16) is attached to a lower base cover assembly (12) on the bottom portion of the housing assembly. The lower base cover (12) assembly comprises an inner cavity which houses the embossing pattern assembly (24).

Figure 3:
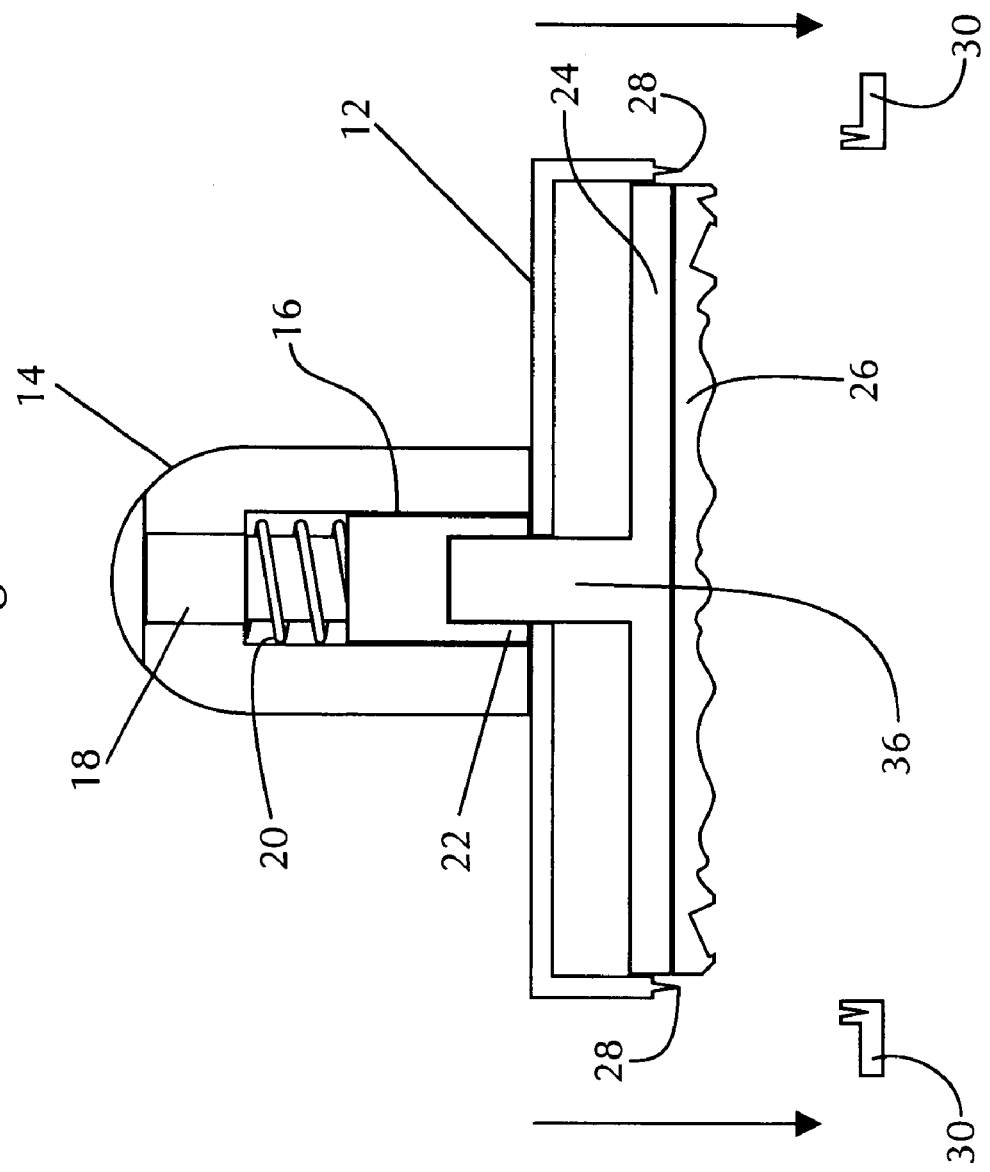
FIG. 3 is a front perspective view of the present invention, illustrating the principal components thereof, including removable covers for the cutting means.

A lowest part of the base cover (12) comprises sharp edges (28) that allow patterns (26) to be cut on the food item to the shape of the base cover. This allows for an enhanced visual effect upon the food in question, as the user may alter the shape of the food in addition to embossing text (34) and/or graphics upon the surface thereof, as shown in FIG. 2. As shown in FIG. 3, it should be noted that a cover or add-on attachment (30) allows the sharp edges (28) to be covered, allowing the user to perform embossing without cutting of any material.

Figure 9:
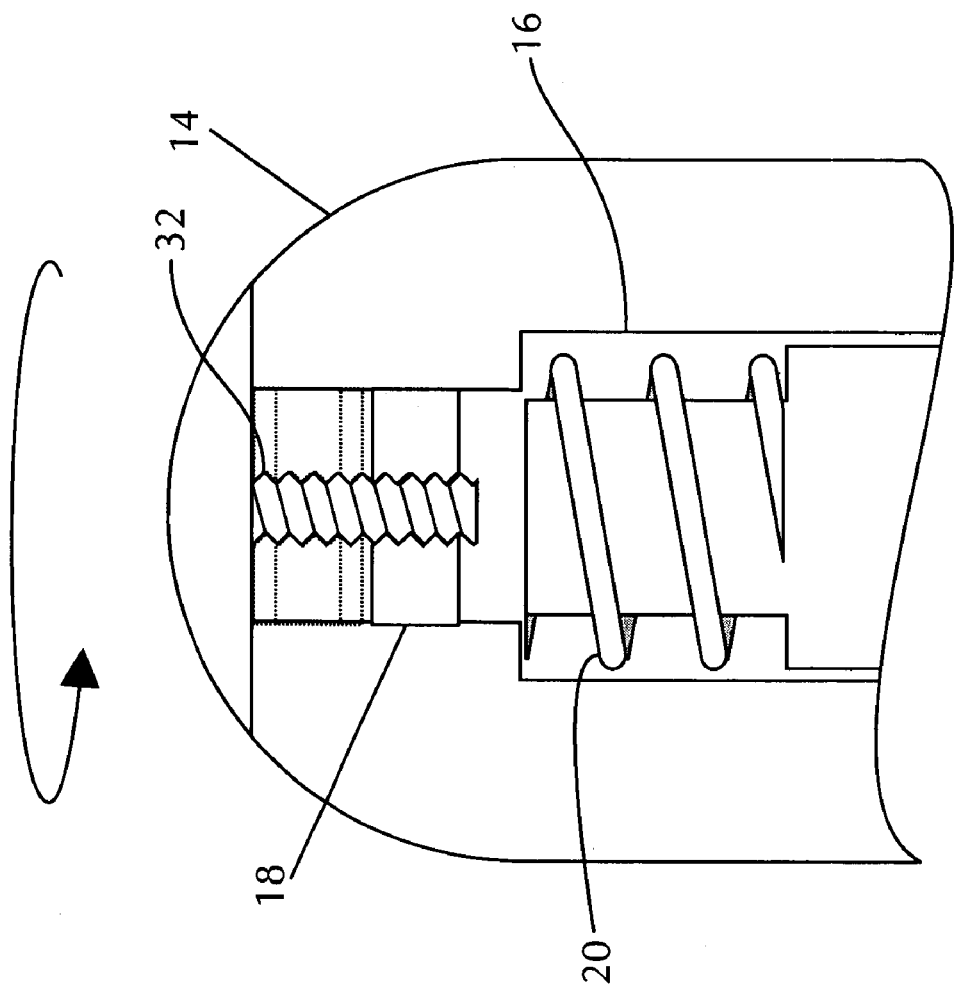
FIG. 9 is a front cutaway view of the handle portion of the present invention, illustrating depth control means for the purposes of example.

Importantly, depth of the embossing for both modes may be accomplished through usage of an adjustable mechanism located at the top of the upper handle assembly (16), in the preferred mode. As best depicted in FIGS. 6, 7 and 9, adjustment may be conveniently made by a rotational movement that revolves around the vertical axis.

The last assembly is located within the underside of the base cover (12). The base cover (12) comprises a cavity that matches the planar dimensions of the embossing pattern assembly (24), but has more depth than the pattern for upward movement.

The embossing pattern (26) is located on the bottom surface of the assembly (24). On the top of the embossing pattern (26) is a shaft (36) that attaches to the upper shaft (18) located in the shaft housing assembly (16). Attachment of the embossing shaft (36) is located at an inner cavity in the upper shaft (18).

As noted, the embossing pattern assembly (24) can be changed for different patterns (26). As such, different embossing patterns (26) may include snap-in letters, slide-in letters, or push-in letters, standard phrases or images, and custom phrases or images (34), allowing the embossing to be tailored to any occasion.

Specifically, at the heart of the invention is the lettering, which may be changed for the purpose of customization. The lettering or graphics may be generically stationary, to provide a series of standard phrases for typical celebratory occasions. For example, the invention provides for usage of stationary phrases such as "Happy Birthday," "Happy Anniversary," or "Happy Graduation."

Alternatively, the invention allows the user to attach an embossing pattern (26) with a personalized message or graphic. For the purpose of example, the invention allows the user to select letters or graphics from an alphabet and series of graphics. Therefore, the user can insert a name after a phrase such as "Happy Birthday," or any other lettering that the user desires.

Importantly, in addition to impressing letters or graphics into foods, the present invention may alternatively allow for embossing using incusing letters or graphics, leaving raised letters or graphics upon the food. Such allows the user to mold letters or graphics into dough to be baked. This may be accomplished through usage of an embossing pattern (26) which comprises cutouts in the shape of previously-determined letters or graphics at the bottom thereof. In addition to the versatility offered by this method, the ability to incuse the letters and graphics decreases the incidence of any sludging or smearing of the letters or graphics on the food during rising of the dough.

Regarding the intended method of utilizing the device, the user first has the stamp with proposed embossing pattern (26) installed. The user also has the desired effect of either simply embossing, or embossing combined with cutting, according to how the base cover (12) is configured. After the stamp is configured to the liking of the user, the embossing stamp is applied to the desired food for embossing. Such may be a single embossing, or may alternatively be a series of separate movements to emboss a repetitive pattern on the food in question.

Regarding manufacture of the device, the modular components of the embossing stamp may be injection molded, cast, molded, or machined from various materials. Such materials include, but are not limited to, polymers, non-ferrous materials, and elastomers. In the preferred mode, the shaft housing and base cover are manufactured out of polymers for ease of production.

Importantly, regarding practicality of use of the device, the stamp is also produced to withstand considerable heat, such as from a dishwasher. The stamper is also constructed to be highly durable in nature, particularly in light of its usage in commercial and industrial settings.

Moreover, adjustment of the depth of embossing can be made to allow perfect impressions on a wide variety of foods that have differing embossing needs and differing thickness. Such renders the stamp device versatile for a great variety of commercial, industrial, or residential applications.

Similarly, the degree to which the means of incused letters or graphics are raised above the surface of the dough or food may be adjusted. As such, the user may select the height of the embossing, according to the type of food in question or according to the type of baking or cooking that the embossing must endure.

In addition, the user may customize embossing patterns through usage of a snap-in, slide-in, or push-in feature. The possibilities include, but are not limited to, standard phrases and images, custom phrases and images, or a customizable kit.

Moreover, the base cover shapes of the device may vary significantly, to allow for additional versatility for the user. For the purposes of example only, such base cover shapes may be anything from a square (which may be used for cheese), rectangular (which may be used for butter) or circular (which may be used for a great variety of foods).

Furthermore, the cutter may have wavy edges to provide an aesthetically-pleasing perimeter or edge of a variety of foods.

In the preferred mode, the size of the stamp device is approximately four inches in height, with width and length being varying depending upon the application in question. For the purposes of example only, a smaller diameter will be three inches, and a larger diameter will be nine inches.

In a further enhanced embodiment of the stamp device, the user may apply color to the embossing on or in the food in question. This provides a further means to decorate and/or advertise upon a variety of foods, as desired by the user.

Finally, it is important to note that the stamp device utilizes a minimal number of parts. Such provides both ease of assembly and disassembly, as well as ease of cleaning in commercial and residential dishwashers.

With regards to all descriptions and graphics, while the invention has been illustrated and described as embodied, it is not intended to be limited to the details shown, since it will be understood that various omissions, modifications, substitutions and changes in the forms and details of the device illustrated and in its operation can be made by those skilled in the art without departing in any way from the spirit of the invention.

Without further analysis, the foregoing will so fully reveal the gist of the present invention that others can readily adapt it for various applications without omitting features that, from the standpoint of prior art, constitute essential characteristics of the generic or specific aspects of this invention. What is claimed as new and desired to be protected by Letters Patent is set forth in the appended claims.

What is claimed is:

1. An enhanced stamper device that functions to emboss images onto foods comprising:

an upper assembly comprising a handle attached to a shaft housing, the handle of sufficient size and configuration to allow the user to comfortably grip and operate the stamp device, a generally cylindrical shaft oriented vertically within the handle, the shaft comprising a first diameter located at a top portion thereof, and a second diameter located at a bottom portion thereof, the first and second diameters functioning to create a means to limit downward movement, the first diameter functioning to create a seat for a spring, which allows the shaft to be forced downward, a shaft housing attached to a lower base cover assembly on the bottom portion of the housing assembly, the lower base cover assembly comprising an inner cavity which houses an embossing pattern assembly, the embossing assembly comprising an embossing pattern thereon, the base cover comprises a cavity that matches planar dimensions of the embossing pattern assembly with greater depth than the pattern for upward movement, the embossing pattern located on a bottom surface of the assembly, a shaft on the top of the embossing pattern attaches to the upper shaft located in the shaft housing assembly, with attachment of the embossing shaft located at an inner cavity in the upper shaft, the embossing pattern assembly able to be changed for different embossing patterns to create different previously-determined images upon the food, including incused images raised above the surface of the food.

2. The enhanced food embossing stamper device as described in claim 1, wherein the device is utilized upon a variety of food items.

3. The enhanced food embossing stamper device as described in claim 1, wherein the handle is removably attached to the shaft housing.

4. The enhanced food embossing stamper device as described in claim 1, wherein the handle is incorporated within the shaft housing.

5. The enhanced food embossing stamper device as described in claim 1, wherein a lowest part of the base cover comprises sharp edges thereon, functioning to allow patterns to be cut on the food to the shape of the base cover.

6. The enhanced food embossing stamper device as described in claim 1, wherein a removable cover attachment allows the sharp edges to be covered, allowing the user to perform embossing without cutting.

7. The enhanced food embossing stamper device as described in claim 1, wherein the user may alter the height of incused images through usage of an adjustable mechanism located at the top of the upper handle assembly.

8. The enhanced food embossing stamper device as described in claim 7, wherein the height adjustment is made by rotational movement of the handle.

9. The enhanced food embossing stamper device as described in claim 1, wherein embossing patterns are selected from the group consisting of snap-in, slide-in, and push-in letters, standard phrases or images, and custom phrases or images, allowing the embossing to be tailored to any occasion.

10. The enhanced food embossing stamper device as described in claim 1, wherein components of the device are injection molded, cast, molded, or machined.

11. The enhanced food embossing stamper device as described in claim 1, wherein the device is manufactured of materials selected from the group consisting of polymers, non-ferrous materials, and elastomers.

12. The enhanced food embossing stamper device as described in claim 1, wherein the device is produced to withstand considerable heat, such as from a dishwasher.

13. The enhanced food embossing stamper device as described in claim 1, wherein the device is used for commercial, industrial, and residential applications.

14. The enhanced food embossing stamper device as described in claim 1, wherein the user may customize embossing patterns through usage of a snap-in, slide-in, or push-in feature, including standard phrases and images, custom phrases and images, or a customizable kit.

15. The enhanced food embossing stamper device as described in claim 1, wherein the base cover is of a shape selected from the group consisting of square, rectangular, triangular, or circular.

16. The enhanced food embossing stamper device as described in claim 1, wherein the cutter comprises wavy edges to provide an aesthetically-pleasing edge on the food.

17. The enhanced food embossing stamper device as described in claim 1, wherein the device is approximately four inches in height.

18. The enhanced food embossing stamper device as described in claim 1, wherein the device is of a diameter of a range of three inches to nine inches.

19. The enhanced food embossing stamper device as described in claim 1, wherein the device allows the user to apply color to the embossing on or in the food.

* * * * *